2,709,523

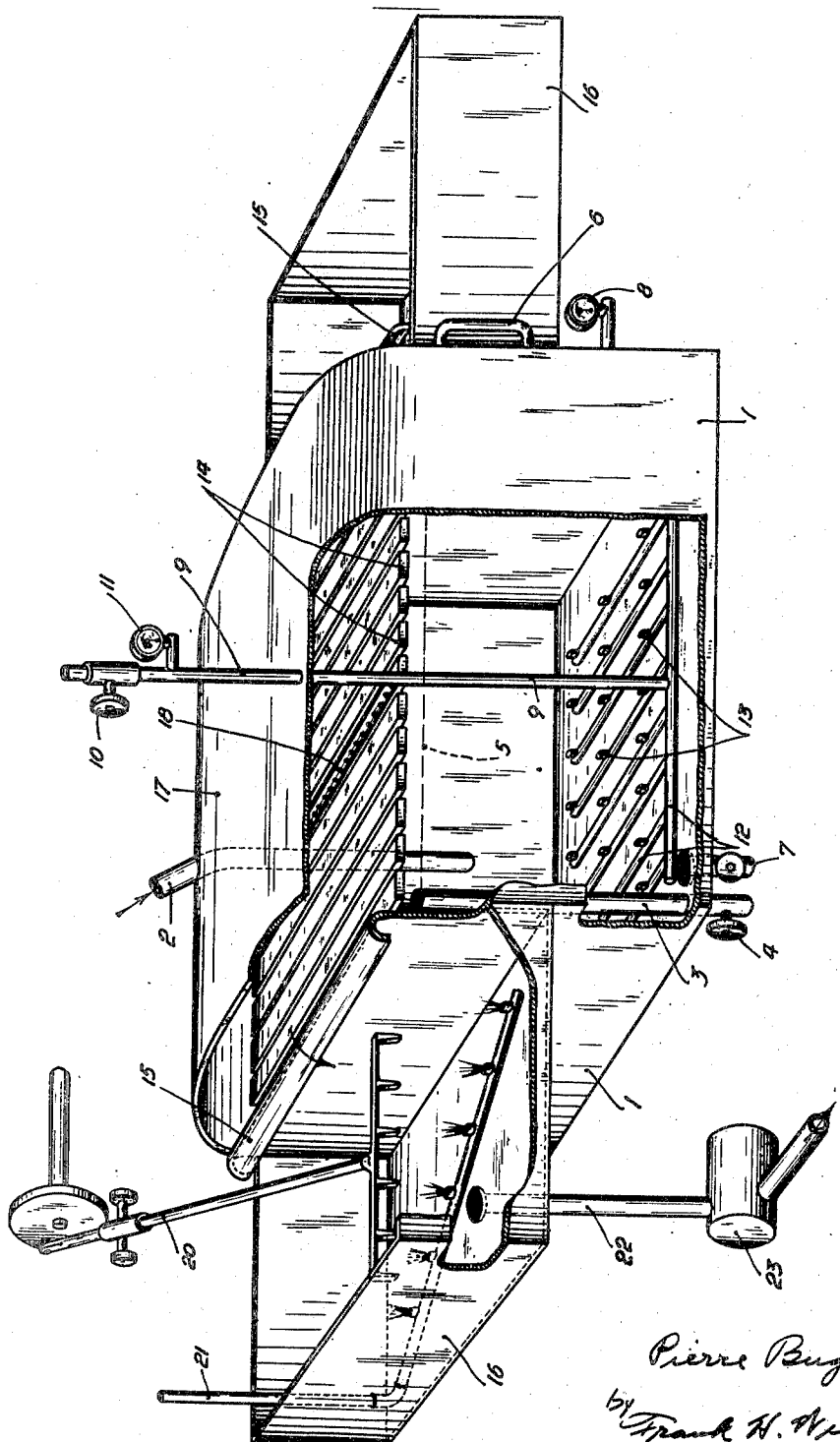

APPARATUS FOR REMOVING WOOL GREASE FROM WOOL WASH

Pierre Bugard, Paris, France

Application June 11, 1951, Serial No. 230,983

6 Claims. (Cl. 210—53)

It is a known fact that wool wash contains a variable proportion of wool grease and it is of advantage to extract such wool grease, firstly because the wool wash should not be transferred into the rivers without previously extracting as far as possible the grease that forms a polluting agent and, on the other hand, because the wool grease has a commercial value either in itself or by reason of the by-products that may be extracted therefrom.

Wool grease has already been extracted from wool washes through various methods, chiefly chemical methods resorting to the extraction by means of acids, bases or solvents of any description or again physical methods resorting to vaporization, cooling, centrifugation or beating. All these methods have appeared as non-economical by reason of the importance of the masses of water to be treated that leads to an intricate plant the importance of which is out of proportion with the amount of grease to be extracted, the percentage of which in the wash is low.

My invention has for its object a preliminary method for treating the wool washes for the extraction of wool grease, according to which air is caused to bubble through the mass of wash carried inside a vat and held at a temperature preferably underneath 40° C.

The froth collected contains about 75% of water; now commercial wool grease should contain less than 1% of water. The froth is therefore allowed to break down and coalesce so as to produce a pasty mass containing a large proportion of wool grease and the volume of which is much less than that of the original wash, said pasty mass being adapted to be treated easily without the drawbacks mentioned hereinabove as generally met in the treatment of mother waters or washes.

Before treatment of the mother waters, it is preferable to remove the sludge from the latter.

The breaking up of the froth is obtained preferably by means of a mechanical stirrer and/or heating means such as a worm or a spray of steam.

The machine used for executing the above method is characterized by the association of a vat with a pipe feeding the wash, pipes feeding air under pressure to the bottom of the vat and provided with jets distributed along said pipes, a grid-shaped duckboard located above the surface of the liquid, one or more overflow chutes at the periphery of the vat at a level slightly higher than that of the duckboard, and a hood capping the whole arrangement and limiting the expanded volume of the froth while providing for the guiding of said froth towards the overflow chutes.

According to a preferred feature of the invention, the froth is urged towards the overflow chutes through nozzles fed with compressed air, located at the center of the machine between the duckboard and the hood and directed towards the overflow chutes.

According to a further auxiliary feature, the overflow chutes lead the froth to at least one auxiliary vat inside which a mechanical beater is adapted to move and/or in which are provided suitable heating means.

I will describe hereinafter a preferred embodiment of the method and means according to the invention, reference being made to accompanying drawings illustrating in cross-sectional view, partly torn off, the apparatus used.

The arrangement illustrated includes a container 1 into which the wash to be treated is introduced through the pipes 2. The excess wash is removed through the overflow drain 3 under control of the valve 4 in a manner such that the level of liquid may remain in the plane 5, as may be checked by a water gauge 6; a draining through the bottom of the vat or container is also provided at 7. The liquid is kept at a temperature, checked by the thermometer 8, which should be preferably lower than the melting point of the wool grease, i. e., about 40° C.

Compressed air is fed into the liquid through the pipe 9; the pressure of said air is adjusted by the valve 10 and indicated by the manometer 11. The air is distributed through the branch tubes 12 provided with the special jets 13 delivering the compressed air into the liquid mass so as to produce a stirring thereof. This results in a plentiful formation of grease-rich froth.

Duckboard constituted by the blades 14 located at a predetermined height above the surface of the liquid has for its object both to separate the froth formed and to control the stirring at the surface of the liquid.

Overflow chutes 15 located at each end of the vat or container are adapted to feed the froth towards the auxiliary containers 16. This feed is made easier through the provision of a hood 17 forming a sort of tunnel guiding the froth towards said auxiliary containers. A pipe 18 fed with air under pressure and provided with ports directed horizontally allows urging the froth towards the overflow chutes 15.

When the froth has been collected in the auxiliary containers 16, it is submitted to a beating as provided by a stirrer 20 that causes it to coalesce.

Furthermore, a steam-fed distributing tube 21 provided with suitable ports cooperates in said coalescence by heating the froth to a temperature above the melting point of the grease. At this moment, the paste obtained is removed through the pipe 22 under the control of the pump 23.

Obviously in the case where the mother waters to be treated are particularly poor in grease, it is possible to treat in succession said mother waters in a number of machines of the type described, said machines being inserted in series in order to provide finally a sufficiently rich paste.

It is also to be remarked that the vat 1 may assume any shape other than that described and in particular it may assume a circular shape, the froth overflowing over the entire periphery of such a vat.

What I claim is:

1. An arrangement for extracting wool grease from wool wash, comprising a vat for the wash, means for feeding the wash to said vat, means for feeding compressed air into the bottom of said vat and including pipes and jets distributed along said pipes, a grid-shaped duckboard lying above the location of the upper surface of the liquid in the vat, at least one overflow chute in the upper part of the vat at a level slightly above the duckboard and a hood capping the vat over the duckboard and overflow chute and further means for feeding compressed air between the hood and the duckboard to urge the froth passing over the duckboard towards the overflow chutes, an auxiliary vat underneath each overflow chute and means for heating the froth fed over the overflow chute inside each auxiliary vat.

2. An arrangement for extracting wool grease from wool wash, comprising a vat for the wash, means for feeding the wash to said vat, means for feeding compressed air into the bottom of said vat and including pipes and jets distributed along said pipes, a grid-shaped duckboard lying above the location of the upper surface of the liquid in the vat, at least one overflow chute in the upper part of the vat at a level slightly above the duckboard and a hood capping the vat over the duckboard and overflow chute and further means for feeding compressed air between the hood and the duckboard to urge the froth passing over the duckboard towards the overflow chutes, an auxiliary vat underneath each overflow chute and a steam fed worm for heating the froth fed over the overflow chute inside each auxiliary vat.

3. An arrangement for extracting wool grease from wool wash, comprising a vat for the wash, means for feeding the wash to said vat, means for feeding compressed air into the bottom of said vat and including pipes and jets distributed along said pipes, a grid-shaped duckboard lying above the location of the upper surface of the liquid in the vat, at least one overflow chute in the upper part of the vat at a level slightly above the duckboard and a hood capping the vat over the duckboard and overflow chute and further means for feeding compressed air between the hood and the duckboard to urge the froth passing over the duckboard towards the overflow chutes, an auxiliary vat underneath each overflow chute and a system of steam-spraying nozzles for heating the froth fed over the overflow chute inside each auxiliary vat.

4. An arrangement for extracting wool grease from wool wash, comprising a vat for the wash, means for feeding the wash to said vat, means for feeding compressed air into the bottom of said vat and including pipes and jets distributed along said pipes, a grid-shaped duckboard lying above the location of the upper surface of the liquid in the vat, at least one overflow chute in the upper part of the vat at a level slightly above the duckboard and a hood capping the vat over the duckboard and overflow chute an auxiliary vat underneath each overflow chute and means for heating the froth fed over the overflow chute inside each auxiliary vat.

5. An arrangement for extracting wool grease from wool wash, comprising a vat for the wash, means for feeding the wash to said vat, means for feeding compressed air into the bottom of said vat and including pipes and jets distributed along said pipes, a grid-shaped duckboard lying above the location of the upper surface of the liquid in the vat, at least one overflow chute in the upper part of the vat at a level slightly above the duckboard and a hood capping the vat over the duckboard and overflow chute an auxiliary vat underneath each overflow chute and means for heating and stirring the froth fed over the overflow chute inside each auxiliary vat.

6. An arrangement for extracting wool grease from wool wash, comprising a vat for the wash, means for feeding the wash to said vat, means for feeding compressed air into the bottom of said vat and including pipes and jets distributed along said pipes, a grid-shaped duckboard lying above the location of the upper surface of the liquid in the vat, at least one overflow chute in the upper part of the vat at a level slightly above the duckboard and a hood capping the vat over the duckboard and overflow chute and further means for feeding compressed air between the hood and the duckboard to urge the froth passing over the duckboard towards the overflow chutes, an auxiliary vat underneath each overflow chute and means for heating and stirring the froth fed over the overflow chute inside each auxiliary vat.

References Cited in the file of this patent

UNITED STATES PATENTS

| | | |
|---|---|---|
| 579,581 | Holmes et al. | Mar. 30, 1897 |
| 662,406 | Edson | Nov. 27, 1900 |
| 793,808 | Sulman et al. | July 4, 1905 |
| 1,198,519 | Bradley | Sept. 19, 1916 |
| 1,251,621 | Barber | Jan. 1, 1918 |
| 1,638,977 | Avery | Aug. 16, 1927 |
| 1,709,783 | Etheredge | Apr. 16, 1929 |
| 2,274,658 | Booth | Mar. 3, 1942 |

FOREIGN PATENTS

| | | |
|---|---|---|
| 363,816 | Germany | Nov. 14, 1922 |